United States Patent [19]

Ohki et al.

[11] Patent Number: 5,008,521
[45] Date of Patent: Apr. 16, 1991

[54] REPRODUCING APPARATUS FOR AN OPTICAL RECORDING MEDIUM

[75] Inventors: Hiroshi Ohki; Shoei Kobayashi; Takuya Wada, all of Kanagawa, Japan

[73] Assignee: Sony Corporation, Tokyo, Japan

[21] Appl. No.: 330,299

[22] Filed: Mar. 29, 1989

[30] Foreign Application Priority Data

Apr. 6, 1988 [JP] Japan .................................. 63-86776

[51] Int. Cl.[5] .......................... G06K 7/10; G07B 7/12
[52] U.S. Cl. .................................. 235/454; 235/470; 235/456; 369/44.11; 382/68
[58] Field of Search ............... 235/436, 454, 456, 470; 369/44.11, 44.14, 44.32, 44.41, 118, 119; 382/65–68

[56] References Cited

U.S. PATENT DOCUMENTS

| | | | |
|---|---|---|---|
| 3,900,716 | 8/1975 | Kawabata et al. | 382/68 X |
| 4,402,088 | 8/1983 | McWaters et al. | 235/454 X |
| 4,818,856 | 4/1989 | Matsushima et al. | 235/454 X |
| 4,931,628 | 6/1990 | Wada | 235/454 |

Primary Examiner—Stuart S. Levy
Assistant Examiner—Steven M. duBois
Attorney, Agent, or Firm—Lewis H. Eslinger

[57] ABSTRACT

A reproducing apparatus reproduces an information signal from a card type optical recording medium from which an information signal can be optically read out and on which an information signal is discretely recorded as a plurality of blocks each consisting of a plurality of track trains. The apparatus comprises a detector formed with a plurality of detecting elements arranged two-dimensionally. A light beam from a reproducing light source irradiates the entire area of the block as a recording unit. The detector detects light reflected from the optical card, and a extractor extracts a detection output of one of the track trains in the block on the basis of a detection output from the detector.

11 Claims, 5 Drawing Sheets

REPRODUCING APPARATUS FOR AN OPTICAL RECORDING MEDIUM

BACKGROUND OF THE INVENTION

1. Field of the Invention

The present invention relates to a reproducing apparatus of an optical recording medium for reproducing information from an optical recording medium such as an optical card.

2. Description of the Prior Art

For instance, as disclosed in Japanese laid open patent No. 60-69873, No. 61-48135 No. 61-50115, and the like, as a construction regarding the reproduction of an information signal from an optical card, there has been known a construction such that a laser beam is radiated onto track trains and a pit image corresponding to one track train is enlarged and formed onto a line sensor comprising, for instance, a CCD (Charge Coupled Device) in which a number of photo sensitive elements are arranged in a straight line. Information of one track train can be simultaneously reproduced by using the line sensor. The optical card is fed step by step at the rate of three or four steps to one track train. A signal is reproduced by scanning at each position.

On the other hand, in Japanese laid open patent No. 62-52730, there has been disclosed a construcion such that information recorded on an optical recording medium is reproduced by using an area image sensor in which a number of photo sensitive elements are arranged on a two-dimensional plane. That is, a system for reading out information on a unit basis of a block consisting of a set of track trains is disclosed in such literature.

The foregoing reproducing apparatus using the line sensor has a drawback such that it is difficult to reproduce at a high speed because of the loss due to the movement time of the optical card.

The high speed reproduction can be performed by the system using the area image sensor. However, according to the above literature, there is a problem such that the apparatus can be applied only to the card having the good linearity of the track trains such as a read only card which is formed from a mask by printing. That is, nothing is shown with respect to solutions in the case where the track trains and the detecting elements of the area image sensor are nonparallel because of a zigzag motion of the track trains due to mechanical vibration when recording by using a laser beam or due to a lack of compatibility among the apparatuses. To solve such a problem, there is considered a method of providing rectilinear guide grooves for guiding the recording beam so that parallel track trains are formed in order to prevent the zigzag motion of the track trains upon recording and to keep the parallel state between the scanning direction by the detecting elements of the area sensor and the track trains. However, since not only the memory capacity of a recording medium decreases but also it is meaningless to provide the guide grooves if they meander, rigorous technical management is needed to form the guide grooves.

OBJECTS AND SUMMARY OF THE INVENTION

It is, therefore, an object of the present invention to provide a reproducing apparatus of an optical recording medium in which the high speed reproduction can be executed and even in the case where the direction of track trains and the direction of detecting elements of an image sensor are not parallel, a signal can be accurately reproduced.

According to the present invention, the above object is accomplished by a reproducing apparatus for an optical medium comprising: an optical recording medium on which an information signal is recorded as rectilinear track trains and a plurality of recording units each consisting of a predetermined number of track trains are discretely recorded; a light source for irradiating a light to a whole area of one of said recording units; detecting means consisting of a plurality of detecting elements arranged two-dimensionally for detecting the light from the optical recording medium by the light source; and extracting means for extracting a detection output of one of the track trains in the recording unit onto which the light is radiated by the light source on the basis of an output signal of the detecting means.

A digital signal is recorded as rectilinear track trains on an optical recording medium such as an optical card. A plurality of recording units (referred to as blocks) each consisting of a predetermined number of track trains are recorded in a matrix form on the optical card. A reproducing optical system which is moved relative to the optical card is provided.

A reproducing light from a reproducing light source is radiated onto the optical card. The radiating range covers the range of one block. An image of the light irradiated block is formed onto an area image sensor consisting of a CCD through an enlarging lens. A multi gradation signal from the image sensor is read out and converted into a digital signal and, further, written into a memory. The reproduction data of each track train is read out of the memory and the portions having no signal are detected. The maximum value of the signal is detected in the region between the non-signal portions. The maximum value is held into a line memory of one track train. The maximum value corresponds to the signal recorded in the track train. The reproduction data is sequentially read out of the line memory. Even when the arranging direction of the image sensor consisting of a CCD and the extending direction of the track trains do not completely coincide, the data of each track train can be read out.

In the invention, the high speed reproduction can be executed by the area image sensor.

The above and other objects and features of the present invention will become apparent from the following detailed description and the appended claims with reference to the accompanying drawings.

DESCRIPTION OF THE PREFERRED EMBODIMENTS

An embodiment of the present invention will be described hereinbelow with reference to the drawings in accordance with the following order.

a. Optical card
b. Reproducing optical system
c. Reproducing circuit
d. Non-signal detecting circuit
e. Reproduction of signal from track train a. Optical Card

Figure 1:
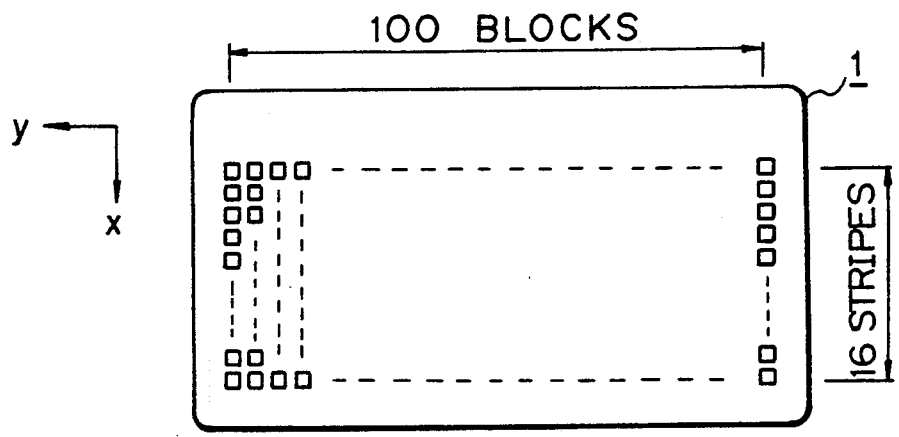
FIG. 1 is a plan view showing an optical card in an embodiment of the present invention.
Figure 2:
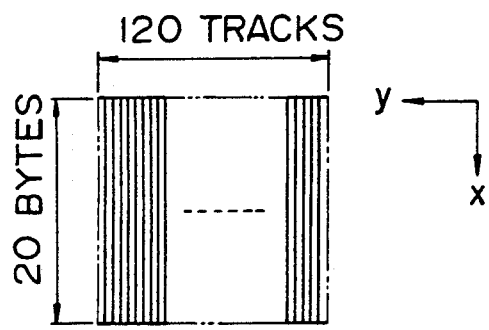
FIG. 2 is a schematic diagram showing one block on the optical card.

In FIG. 1, reference numeral 1 denotes an optical card in the embodiment. The optical card 1 is constructed by laminating a protective substrate, a recording film, and a back layer serving as a protective layer of the recording film. The recording film is made of a material such as antimony-selenium, bismuth-tellurium, or the like whose reflectance changes when it is irradiated by a laser beam. The optical card 1 is what is called a WORM type since an information signal can be optically recorded. A digital information signal is recorded on the optical card 1 on a unit basis of a block consisting of a plurality of track trains. However, the optical card 1 of the invention does not have a guide groove to rectilinearly guide a laser beam from a recording light source of a recording optical system when an information signal is recorded (a guide groove a also be used to guide a laser beam from a reproducing light source when the information signal is reproduced by a reproducing optical system), a prepattern which is used for making the scanning direction by the detecting means and the track trains parallel, and or the like. For instance, sixteen stripes each consisting of 100 blocks are formed on the optical card 1. As shown in FIG. 2, one block comprises 120 tracks and data of 20 bytes is recorded as an optical pattern in one track train.

In the recording mode, the optical card 1 is fed step by step at a predetermined pitch in a y direction in FIGS. 1 and 2 by card feeding means. By scanning the recording film in an x direction by a recording laser beam, each track train is formed. The scanning of the laser beam is executed by beam scanning means such as a galvano mirror or the like provided for the recording optical system. In the reproducing mode, when a predetermined block is accessed, data of one block is reproduced in a state in which both the optical card 1 and the reproducing optical system are at rest. To access a predetermined block, the optical card 1 is fed in the y direction at a predetermined interval, for instance, on a block unit basis by the card feeding means and the reproducing optical system is moved in the x direction by the optical system feeding means, thereby enabling a predetermined block to be accessed.

A predetermined block can be also accessed by fixing either one of the reproducing optical system and the optical card and by moving the other in the x and y directions.

Figure 3:
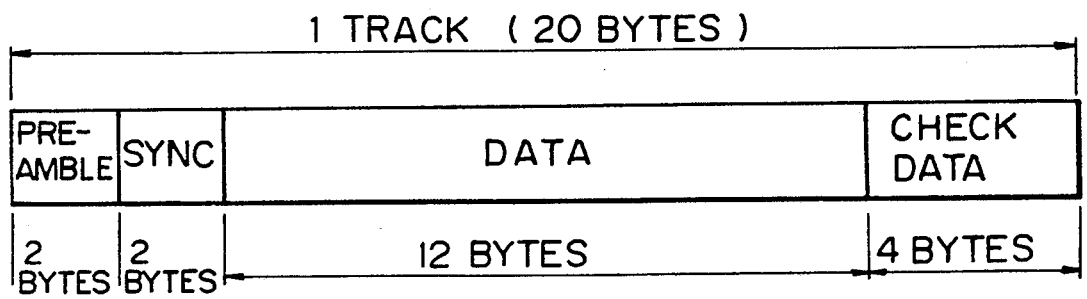
FIG. 3 is a schematic diagram of a data arrangement of one track.

On the other hand, the recording data of one track train has such a construction as shown in FIG. 3. A preamble of two bytes is added in the beginning. A sync signal of two bytes is then added. Data of 12 bytes is located after the sync signal. Check data of four bytes (redundancy code of error correction code) is added after the data. For instance, a product code which is completed in one block is used as the error correction code.

b. Reproducing Optical System

Figure 4A:
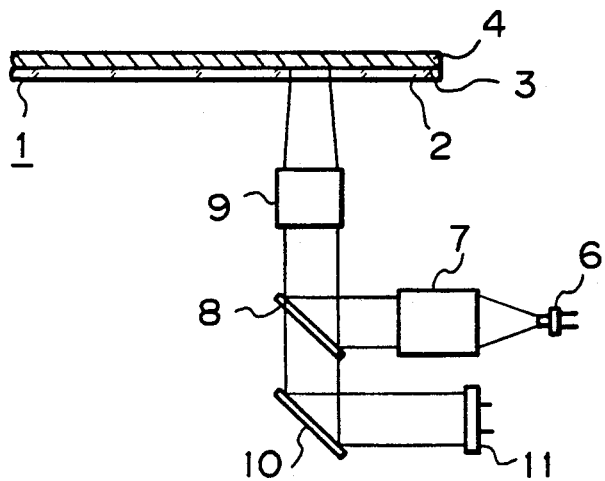
FIGS. 4A and 4B are a schematic diagram and a perspective view for explaining a reproducing optical system.
Figure 4B:
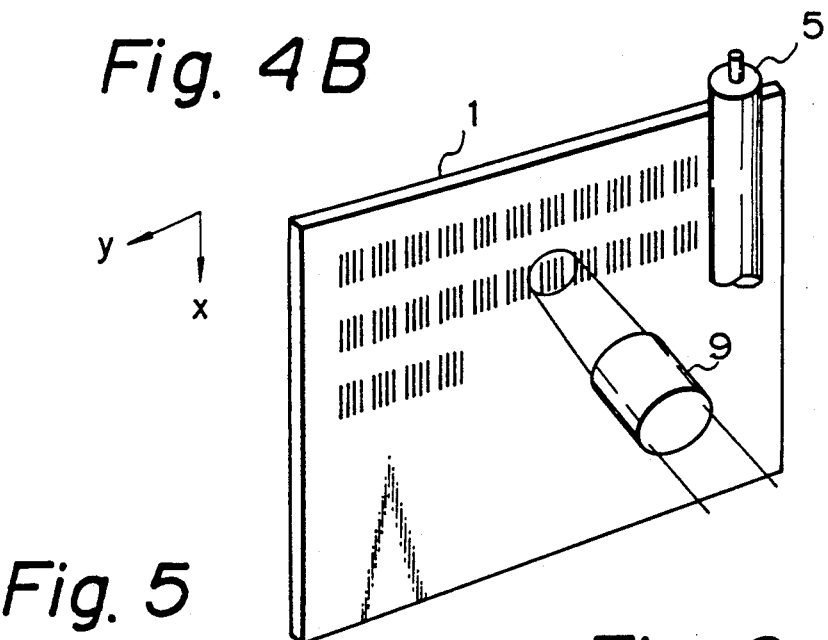

FIGS. 4A and 4B show an example of the reproducing optical system. The optical card 1 is formed by laminating a protective substrate 2, a recording film 3, and a back layer 4 also functioning to protect both the protective substrate 2 and recording film 3. A display section is formed on the surface of the back layer 4 as necessary by printing or the like. As shown in FIG. 4B, the optical card 1 is fed in the y direction by a driving roller 5 of the card feeding means. Although not shown, the driving roller 5 is rotated by a stepping motor in the recording mode and is rotated by a DC motor in the reproducing mode.

The reproducing optical system has a reproducing light source, for instance, a light emitting diode 6. The reproducing light emitted from the light emitting diode 6 is converted into the parallel light by a condenser lens 7 and is transmitted to a half mirror 8 to bend the optical path of the parallel reproduction light by 90°. The parallel light is bent by 90° by the half mirror 8 and is radiated onto the optical card 1 through an image forming lens 9. An irradiating range of the reproducing light is set to a range of one block. In the embodiment, to access a predetermined block, the optical card 1 is fed in the y direction on a block unit basis and the reproducing optical system can be moved in the x direction. In this case, as mentioned above, it is also possible to construct the apparatus so that the optical system is at rest and the optical card 1 is moved in the x and y directions by an x-y stage.

Figure 5:
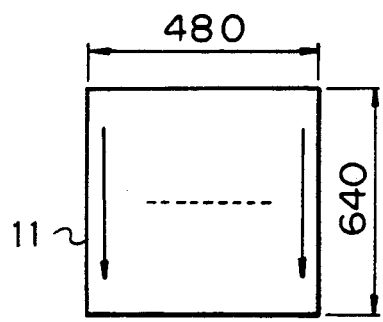
FIG. 5 is a schematic diagram for explaining an image sensor.

The reflected light of the reproducing light is projected through the half mirror 8 and a mirror 10 onto an area image sensor 11 comprising a CCD or the like on which picture elements are two-dimensionally arranged. The optical image of one block is formed onto the area image sensor 11. In the track trains on the recording medium, the data recording portion irradiated by the laser beam from the recording optical system and the portion not thus irradiated have an optical density difference, that is, different reflectances. As shown in FIG. 5, the area image sensor 11 has 480 picture elements in the feeding direction (y direction) of the optical card 1 and has 640 picture elements in the direction (x direction) of the track trains.

Figure 6:
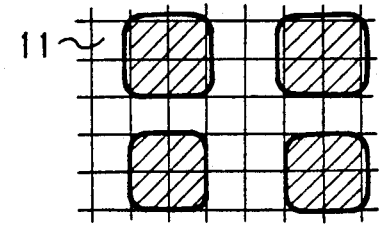
FIG. 6 is a schematic diagram showing a pit image which is formed on the image sensor.

The reproducing optical system is constructed as an enlarging optical system. The image of one block is enlarged, for instance, four times and formed onto the image sensor 11. For instance, as shown in FIG. 6, the image of the minimum pit having a diameter of 5 $\mu$m is formed onto four picture elements having the size of picture element of (10 $\mu$m × 10 $\mu$m) of the image sensor 11. When a track pitch is set to 10 $\mu$m, the image of one block consisting of 120 track trains is formed onto the image sensor 11 of (480 × 640 elements). Assuming the shortest recording wavelength is set to 10 $\mu$m/pitch, data of 20 bytes is enclosed in one track. The 20 bytes have the data arrangement shown in FIG. 3. As will be obvious from FIG. 3, since data of 12 bytes is included in one track, data of (120 × 12 = 1.44 kbytes) can be recorded in one block.

The image sensor 11 has a construction similar to that of the sensor used in a video camera. The signal charges are sequentially read out in the direction of the track train and the whole signal of the image sensor 11 is completely read out for a time of (1/60) second. Therefore, the image signal can be read out at a high speed of 86.4 kbytes/sec (=60×1.44 kbytes).

c. Reproducing Circuit

Figure 7:
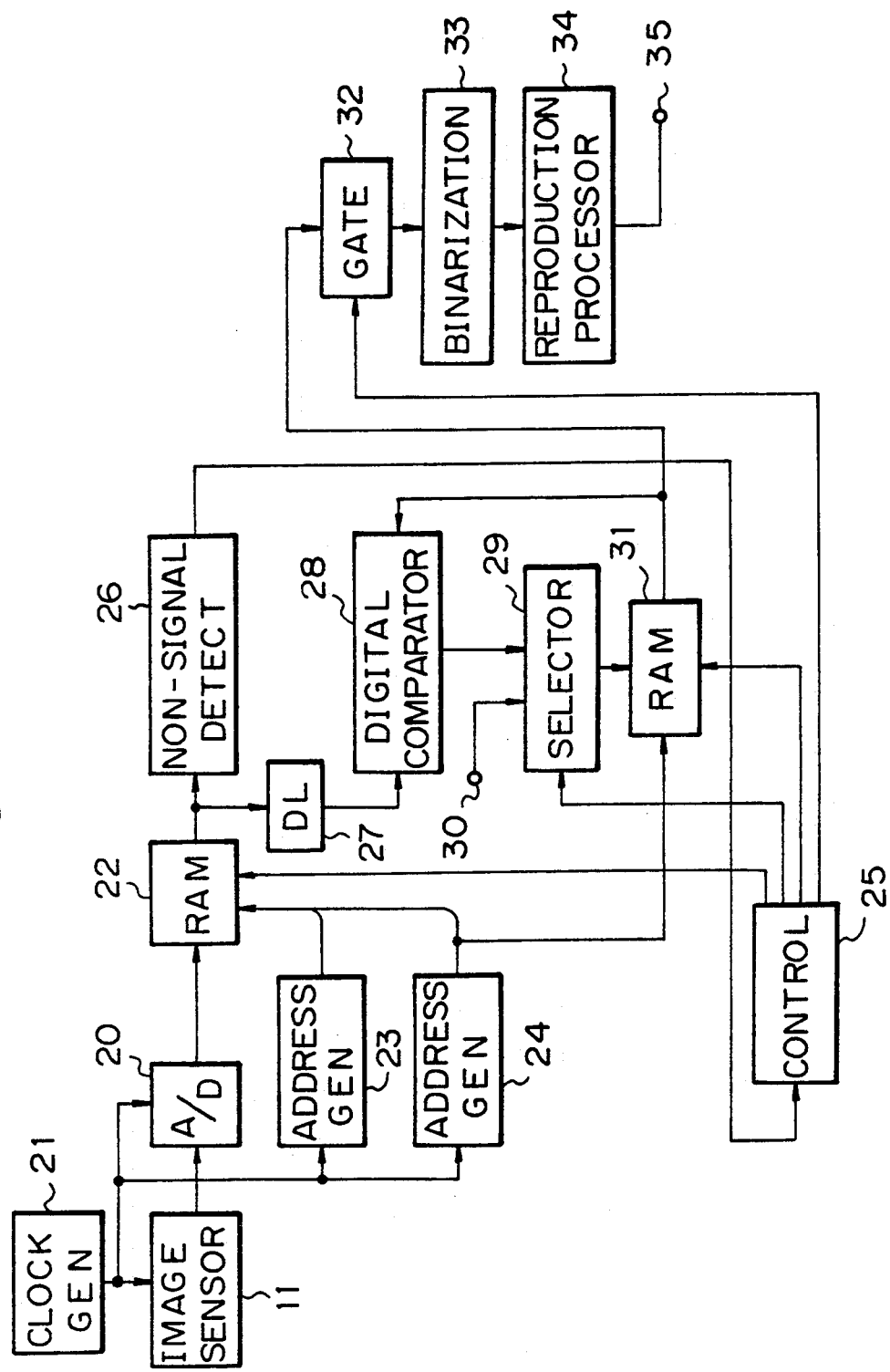
FIG. 7 is a block diagram of an example of a reproducing circuit.

The multi gradation output signal from the image sensor 11 is supplied to an A/D converter 20 as shown in FIG. 7. A drive clock which is supplied from a clock generating circuit 21 to the image sensor 11 is also supplied to the A/D converter 20. The output signal of each pixel of the image sensor 11 is converted into the digital signal of eight bits. The digital signal from the A/D converter 20 is written into a RAM 22.

The RAM 22 has addresses in the x and y directions which correspond to the positions of the picture elements of the image sensor 11 in a one-to-one correspondence relation. The output signal of each picture element is written into the corresponding address. The address in the y direction is formed by an address generating circuit 23. The address in the x direction is formed by an address generating circuit 24. Both of the addresses in the x and y directions are supplied to the RAM 22. A control signal to control the writing and reading operations for the RAM 22 is supplied from a control circuit 25.

When the output signal of the image sensor 11 is written into the RAM 22, the reading operation of the RAM 22 is started. The digital signals of the track trains extending in the x direction (lengthwise direction of the track trains) are successively read out of the RAM 22. The readout output of the RAM 22 is supplied to a non-signal detecting circuit 26 and is also supplied to one input terminal of a digital comparator 28 through a delay circuit 27. The delay circuit 27 is provided to delay the data by a time which is required to detect a non-signal. An output signal of an RAM 31 is supplied to the digital comparator 28. The digital comparator 28 compares the data of eight bits read out of the RAM 22 with the data of eight bits read out of the RAM 31 and outputs the data having a larger value.

The output data of the digital comparator 28 is supplied to one input terminal of a selector 29. Zero data is supplied from a terminal 30 to the other input terminal of the selector 29. Output data of the selector 29 is input to the RAM 31. When the non-signal is detected, the zero data is selectively supplied to the RAM 31 by the selector 29 and the RAM 31 is cleared.

The RAM 31 is a line memory which can store data of one train of the image sensor 11 or RAM 22. The address in the x direction is supplied from the address generating circuit 24 to the RAM 31. On the other hand, the control signal to control the writing and reading operations is also supplied from the control circuit 25 to the RAM 31. As will be explained hereinlater, the maximum value of the data which is obtained for a period of time from the detection of the train of the non-signal to the detection of the next train of the non-signal is stored into the RAM 31.

The maximum value of the data is read out of the RAM 31 and supplied to a binarizing circuit 33 through a gate circuit 32. The gate circuit 32 is controlled by a control signal from the control circuit 25. Only the data of the maximum value stored in the RAM 31 is supplied to the binarizing circuit 33. The maximum value data is converted into the binary data by the binarizing circuit 33 and the binary data is supplied to a reproducing processor 34. The reproducing processor 34 has a circuit to perform the demodulation of the digital modulation, for instance, phase coding, an error correction circuit, and the like and executes an error correcting process on a block unit basis. The reproduction data is taken out to an output terminal 35 of the reproducing processor 34.

d. Non-signal Detecting Circuit

Figure 8:
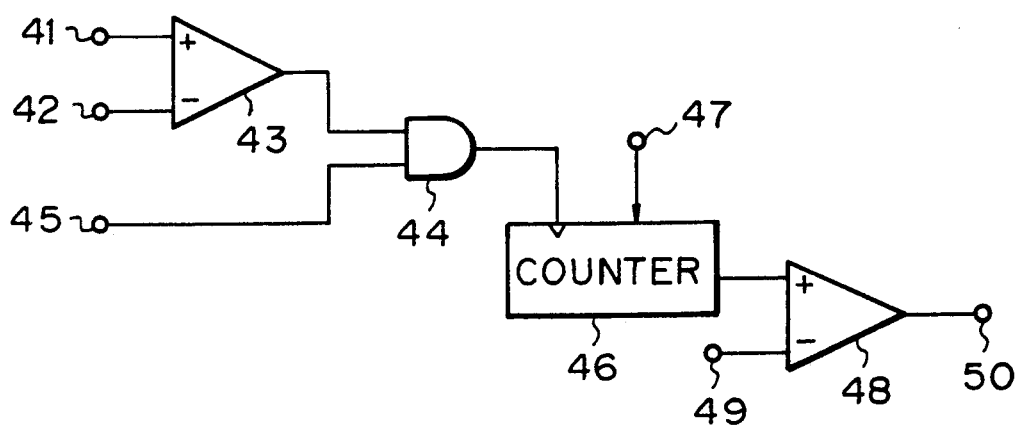
FIGS. 8 to 10 are block diagrams showing three examples of a non-signal detecting circuit.

The non-signal detecting circuit 26 detects a non-signal region between track trains. FIG. 8 shows an example of the non-signal detecting circuit 26. In FIG. 8, the data read out of the RAM 22 is supplied to an input terminal 41. A threshold value is supplied to an input terminal 42. The difference (=the output of the RAM 22−the threshold value) between the input signals is calculated by a subtracting circuit 43. A bit in which the most significant bit of the difference is inverted is output from the subtracting circuit 43 and supplied to an AND gate 44. The output bit of the subtracting circuit 43 is set to the high level when the difference has a positive value, that is, when the output of the RAM 22 is larger than the threshold value.

A clock pulse is supplied from a terminal 45 to the AND gate 44. The clock pulse transmitted through the AND gate 44 is supplied as a clock to a counter 46. The counter 46 is cleared by a clear pulse from a terminal 47 each time the data of one train is read out of the RAM 22. A count value of the counter 46 is supplied to a comparator 48 and compared with a threshold value from a terminal 49. For instance, when the count value of the counter 46 is smaller than the threshold value, the comparator 48 generates a detection signal of the high level.

As mentioned above, when the data read out of the RAM 22 is larger than the threshold value, the output signal of the subtracting circuit 43 is set to the high level and the clock pulse is supplied through the AND gate 44 to the counter 46. Therefore, when the data of one train is read out of the RAM 22 and when a signal exists, the count value of the counter 46 has a large value and the output signal of the comparator 48 is set to the low level. On the other hand, when no signal exists in one train read out, the count value of the counter 46 has a small value and the output signal of the comparator 48 is set to the high level. Reference numeral 50 denotes an output terminal.

Figure 9:
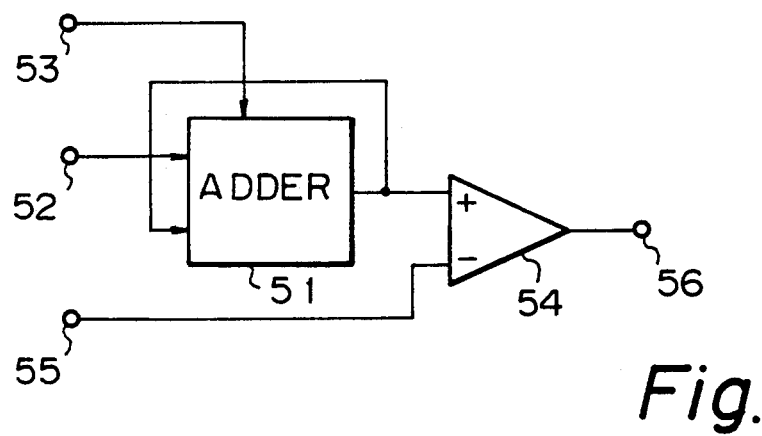

FIG. 9 shows another example of the non-signal detecting circuit 26. An output of an adder 51 and the readout data of the RAM 22 which is input from a terminal 52 are added by the adder 51. The adder 51 is reset by a reset signal from a terminal 53 each time the data of one train is read out. The output signal of the adder 51 is supplied to a comparator 54 and compared with a threshold value from a terminal 55. When the addition output of the adder 51 is smaller than the threshold value, the comparator 54 generates a detection signal of the high level to an output terminal 56.

When a signal exists in the data of one train which was read out of the RAM 22, the addition output of the adder 51 has a large value and the detection signal obtained at the output terminal 56 is set to the low level. On the other hand, when no signal exists in the data of one train which was read out of the RAM 22, the addition output of the adder 51 has a small value and the detection signal obtained at the output terminal 56 is set to the high level.

Figure 10:
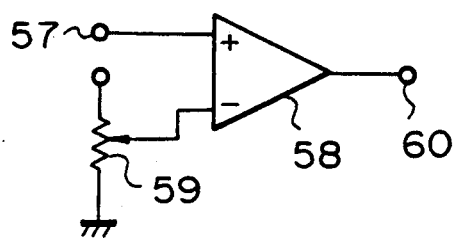

Further, a non-signal can be also detected at the stage of an analog signal. As shown in FIG. 10, an analog output signal from the image sensor 11 is supplied to a terminal 57. The analog output signal and a reference voltage formed by a variable resistor 59 are compared by a level comparator 58. When the level of the analog output signal is smaller than the reference voltage, the level comparator 58 generates a high level detection signal. The high level detection signal is taken out to an output terminal 60.

e. Reproduction of Signal from Track Train

It is ideal that the track trains formed on the optical card 1 and the arrangement in the x direction of the picture elements of the CCD image sensor 11 are parallel. However, the track trains and the arrangement in the x direction of the picture elements of the image sensor 11 are not always parallel in the case where there are positional differences among the optical card 1, the recording optical system, and the reproducing optical system, where the optical card recorded by another apparatus is reproduced, or the like. Even in this case, it is necessary that an information signal can be accurately reproduced from the track train.

Figure 11A:
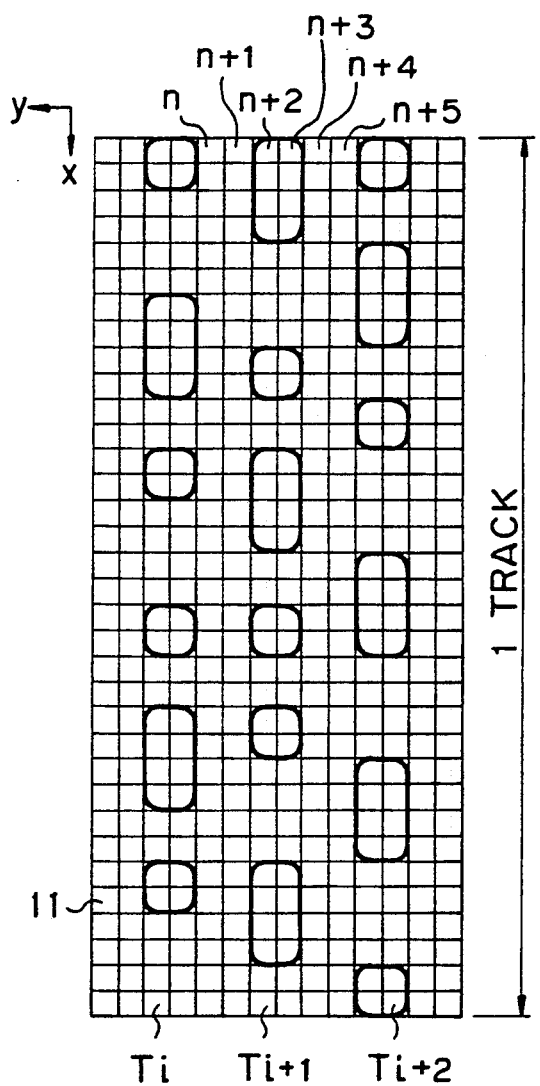
FIGS. 11A and 11B are schematic diagrams for explaining the operation to reproduce a signal from a track train.

FIG. 11A shows the ideal case where track trains $T_i$, $T_{i+1}$, and $T_{i+2}$ on the optical card 1 and the arrangement in the x direction of the picture elements of the image sensor 11 are parallel. In FIG. 11A, an amount of data of one track is shown shorter than the actual amount for representation and explanation. Each of the output signals of the picture elements of the image sensor 11 is converted into the digital signal by the A/D converter 20 and written into the address in the RAM 22 which corresponds to one of the picture elements in a one-to-one corresponding relation.

The output signals of track trains n, n+1, n+2, ... of the image sensor 11 in FIG. 11A are sequentially read out and converted into the digital signals by the A/D converter 20 and written into the RAM 22. The digital signal of each train is read out of the RAM 22. When the data of the train n is first read out, the detection signal is generated from the non-signal detecting circuit 26 since the train n is the non-signal train. The detection signal is supplied to the control circuit 25. The selector 29 selects the zero data by the control signal generated from the control circuit 25. On the other hand, in the RAM 31 as the line memory, the writing and reading operations are time-sharingly executed and, further, the gate circuit 32 is turned on. That is, the previous maximum value stored in the RAM 31 is read out and the zero data is written into the RAM 31 through the selector 29 and the RAM 31 is cleared. The readout data of the RAM 31 is supplied to the binarizing circuit 33 through the gate circuit 32.

In the next train n+1, the above operations are repeated since the train n+1 is similarly a non-signal train. However, the gate circuit 32 is not turned on and the data of the non-signal train is not supplied to the binarizing circuit 32.

Since the train n+2 is not a non-signal train, the selector 29 selects the output data of the digital comparator 28. The output data of the digital comparator 28 is written into the RAM 31. The data of the train n+2 is written into the RAM 31. The data of the train n+3 is also written into the RAM 31. The data having a higher level between the data of the trains n+2 and n+3 is output from the digital comparator 28 and written into the RAM 31. Since the next train n+4 is detected as a non-signal train, the data of the maximum value stored in the RAM 31 is supplied through the gate circuit 32 to the binarizing circuit 33 and the RAM 31 is cleared. In the binarizing circuit 33 or reproducing processor 34, only the maximum value data from the RAM 31 is used as effective data.

Figure 11B:
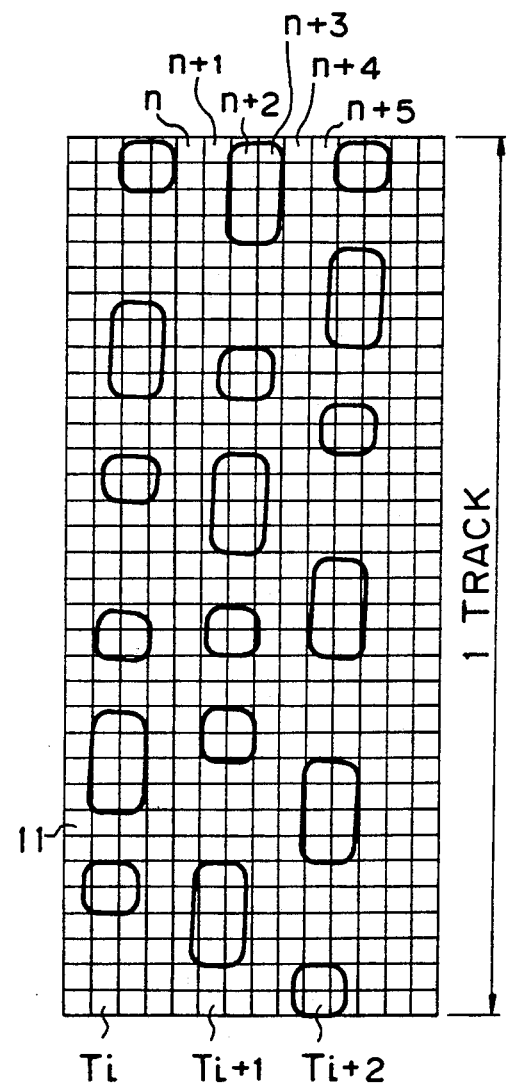

Different from the case of FIG. 11A, actually, as shown in FIG. 11B, in many cases, the lengthwise directions of the tracks $T_i$, $T_{i+1}$, $T_{i+2}$, ... and the arrangement in the x direction of the picture elements of the image sensor 11 are not parallel. Even in this case, the maximum value data is stored into the RAM 31 in a manner similar to the foregoing operation.

In the example of FIG. 11B, the train n is detected as a non-signal train and the maximum value among the output signals of the trains n+1, n+2, and n+3 located in the region between the train n and the next non-signal train n+4 is stored into the RAM 31. The maximum value is supplied as a reproduction signal of the track $T_{i+1}$ to the binarizing circuit 33 through the gate circuit 32.

The present invention is not limited to the WORM type optical card but can be applied to the recording and reproduction of information onto and from other optical recording media such as a ROM type optical card, erasable type optical card, and the like.

According to the invention, a signal can be read out from an optical recording medium and the high speed reproduction can be executed without changing the relative positional relation between the optical system and the optical recording medium. On the other hand, according to the invention, even in the case where the directions of the track trains and the the detecting elements of the area image sensor are not parallel, the signal can be accurately reproduced.

We claim:

1. A reproducing apparatus comprising:
    an optical recording medium from which an information signal can be optically read and onto which an information signal is discretely recorded as a plurality of recording units each comprising a plurality of track trains;
    a light source;
    an optical system for causing a light beam from said light source to irradiate a whole area of one of said plurality of recording units and for guiding a light beam reflected from said recording medium;
    detecting means comprising a plurality of detecting elements arranged two-dimensionally for detecting said reflected beam as guided by said optical system;
    extracting means for extracting a detection output of one track train of said recording unit irradiated by said light source on the basis of an output signal of the detecting means and including a comparing means for successively comparing the detection outputs from said detecting means and a line memory means for storing an output of said comparing means; and
    memory means for storing digitally converted detection output from said detecting means and including a first address generating circuit to generate an address in a direction parallel with said track trains and a second address generating circuit to generate an address in a direction perpendicular to the said track trains, and in which an address signal from said first address generating circuit is also supplied to said line memory means.

2. An apparatus according to claim 1, wherein said extracting means has non-signal recording portion detecting means for detecting non-signal recording portions among the track trains in said recording unit.

3. An apparatus according to claim 2, wherein as the detection signal of one track train in the recording unit, said extracting means outputs the maximum one of output signals of the detecting elements of said detecting means which are obtained for a period of time from the detection of the non-signal recording portion by said non-signal recording portion detecting means to the detection of the next non-signal recording portion.

4. An apparatus according to claim 3, further comprising gate means for supplying the output signal from said extracting means to a reproduction processor when said non-signal recording portion detecting means detects the next non-signal recording portion.

5. An apparatus according to claim 4, wherein said comparing means successively compares the detection outputs which are output from said detecting means for a period of time until the next non-signal recording portion is detected by said non-signal recording portion detecting means and produces as an output the larger detection output.

6. An apparatus according to claim 5, wherein said extracting means has control means for allowing the comparison output signal of said comparing means and a clear signal to be selectively supplied to said line memory means when the next non-signal recording portion is detected by said non-signal recording portion detecting means.

7. An apparatus according to claim 5, wherein said comparing means comprises a digital comparator to compare output signals from said memory means.

8. An apparatus according to claim 2, wherein said non-signal recording portion detecting means comprises a counter and a comparator for comparing an output signal from said counter with a threshold value, and when the output signal from said detecting means has a value equal to or exceeding a predetermined value and the output signal of said counter is smaller than said threshold value, said detecting means outputs a non-signal detection output.

9. An apparatus according to claim 2, wherein said non-signal recording portion detecting means comprises an adder for adding a detection output from said detecting means and a comparator for comparing an output signal of said adder with a threshold value, and when the output signal of said adder is smaller than said threshold value, said detecting means outputs a non-signal detection output.

10. An apparatus according to claim 2, wherein said non-signal recording portion detecting means has a comparator for comparing a detection output from said detecting means with a threshold value, and when the detection output from said detecting means is smaller than said threshold value, said detecting means outputs a non-signal detection output.

11. A reproducing apparatus for reproducing an information signal discretely recorded on an optical recording medium as a plurality of recording units each comprising a plurality of track trains, said apparatus comprising:
a light source;
an optical system for causing a light beam from said light source to irradiate a whole area of one of said plurality of recording units and for guiding a light beam reflected from said recording medium;
detecting means comprising a plurality of detecting elements arranged two-dimensionally for detecting said reflected beam as guided by said optical system;
extracting means for extracting a detection output of one track train of said recording unit irradiated by said light source on the basis of an output signal of the detecting means, including comparing means for successively comparing detection outputs from said detecting means and line memory means for storing an output of said comparing means; and
memory means for storing digitally converted detection output from said detecting means and including a first address generator for generating an address in a first direction parallel to said track trains and a second address generator for generating an address in a direction perpendicular to said track trains, and in which an address signal from said first address generator is fed to said line memory means.

* * * * *